April 8, 1930.  A. E. GANNON ET AL  1,753,566
BOX HOOK
Filed Nov. 7, 1928
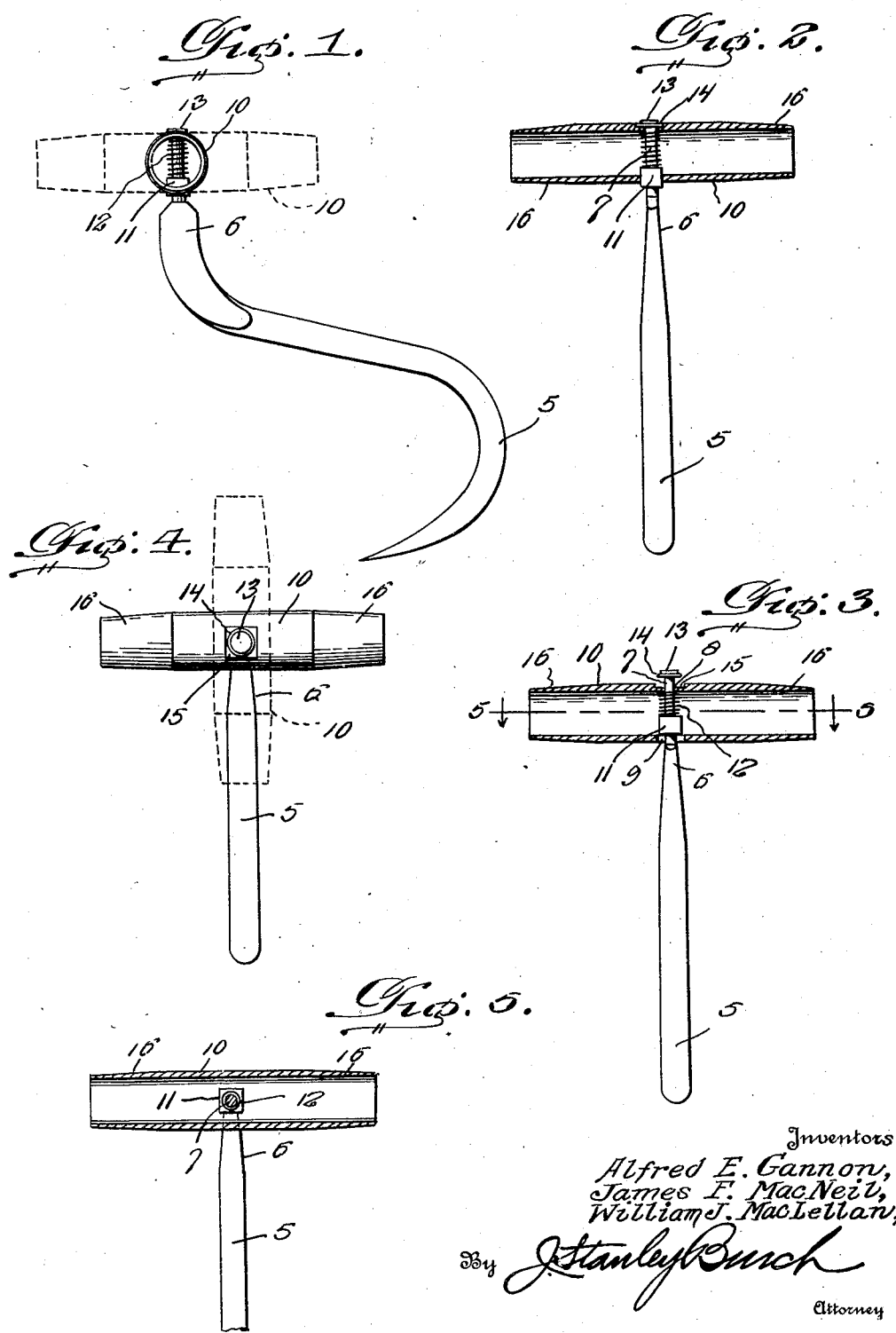
Inventors
Alfred E. Gannon,
James F. MacNeil,
William J. MacLellan,
By J. Stanley Burch
Attorney Patented Apr. 8, 1930

1,753,566

UNITED STATES PATENT OFFICE

ALFRED E. GANNON, JAMES F. MacNEIL, AND WILLIAM J. MacLELLAN, OF LONG BEACH, CALIFORNIA

BOX HOOK

Application filed November 7, 1928. Serial No. 317,748.

This invention relates to box hooks, such as are used in handling freight goods and the like.

More particularly, the present invention embodies an improved box hook of that type wherein the handle of the hook may be readily adjusted to a position at right angles to the plane of the hook member thereof for working purposes, or to a position parallel with said plane for the purpose of convenience and safety in carrying the hook while not in use.

The object of the present invention is to provide a hook of the above kind which is extremely simple and durable in construction, economical to manufacture, and efficient in use.

In the accompanying drawing:

Figure 1 is a side elevational view of a box hook embodying the present invention.

Figure 2 is a view looking toward the left of Figure 1, with the handle in central longitudinal section.

Figure 3 is a view similar to Figure 2 with the handle depressed to released position, preparatory to adjustment thereof parallel with the plane of the hook member.

Figure 4 is a top plan view of the hook as shown in Figure 2; and

Figure 5 is a horizontal section on line 5—5 of Figure 3.

Referring more in detail to the drawing, the present box hook embodies a hook member 5 having a shank 6 provided with a reduced cylindrical free end portion 7 which slidably extends through vertically alined central openings 8 and 9 provided respectively in the top and bottom of a tubular metal cross bar or handle 10. The opening 8 is circular and has the shank portion 7 rotatably fitted therein, while the opening 9 is of square form and adapted for snug removable reception of an integral or rigid square enlargement 11 provided on the shank portion 7 above but near its lower end.

Encircling the shank portion 7 between the top of the enlargement 11 and the top of the handle 10, within the latter, is a helical compression spring 12 by means of which the handle 10 is normally pressed upwardly to enter and yieldingly retain the enlargement 11 in the opening 9 and secure the handle either at right angles to or parallel with the plane of the hook member 5. The upward movement of the handle is properly limited by the head or other stop member 13 on the upper projecting end of the shank portion 7, and a washer 14 is placed on the shank portion 7 between the head 13 and the top of the handle 10 to permit use of a small head without danger of the shank portion ultimately pulling through the opening 8. An external square recess 15 is formed in the top of the handle 10 about the opening 8 to receive the stop members 13 and 14 when the handle is elevated and held against turning. This avoids objectionable projecting of these stop members, and the ends of the handle 10 are externally tapered as at 16 to provide a most suitable hand grip. As a modification of the stop means, the stop members 13 and 14 may be integrally formed together and fixed to the shank 7, the portion 14 being square for fitting in the recess 15 when the handle is in its upward position, thereby functioning to provide a double means for preventing turning of the handle in relation to the hook.

To turn the handle so as to lie parallel with the plane of the hook member 5, said handle is depressed as shown in Figure 3, against the spring 12 until the enlargement 11 is clear of the opening 9 in the handle. The handle is then turned through one-quarter of a revolution and allowed to spring upwardly again. The same operation is repeated when it is desired to position the handle at right angles to the hook member for working purposes.

It will be seen that the handle is tubular and of durable and strong one-piece or integral form, thereby insuring cheapness in manufacture and lightness in weight. Moreover, the openings 8 and 9 may be readily formed and the latter is of more desirable character than a square socket or recess.

Minor changes are contemplated within the spirit of the invention as claimed.

What we claim as new is:

A box hook comprising a hook member having a shank provided with a reduced free end portion, said reduced end portion of the shank having a square enlargement above but near to its lower end, a tubular handle having alined central top and bottom openings through which said reduced end portion of the shank slidably extends, the bottom opening being square to snugly removably receive the square enlargement, stop means on the upper end of said reduced end portion of the shank to limit upward movement of the handle on the latter to a position wherein the enlargement is engaged in said square opening, and a spring interposed between the top of the enlargement and the top of the handle to yieldingly hold the latter upward, said handle being depressible for release from the enlargement and rotary adjustment on the shank of said hook member, and an external square recess in the top of the handle about the top opening to receive the stop means thereby providing a double means for holding the handle in fixed relation to the hook when the handle is in its upward position.

In testimony whereof we affix our signatures.

ALFRED E. GANNON.
JAMES F. MacNEIL.
WILLIAM J. MacLELLAN.